United States Patent [19]
Tomita et al.

[11] Patent Number: 4,464,185
[45] Date of Patent: Aug. 7, 1984

[54] EXHAUST GAS FILTER

[75] Inventors: Masahiro Tomita, Anjo; Toshiyuki Tsukao, Okazaki, both of Japan

[73] Assignee: Nippon Soken, Inc., Nishio, Japan

[21] Appl. No.: 354,431

[22] Filed: Mar. 3, 1982

[30] Foreign Application Priority Data

Mar. 7, 1981 [JP] Japan .................................. 56-32847
Oct. 20, 1981 [JP] Japan ................................. 56-168213

[51] Int. Cl.$^3$ ............................................ B01D 39/20
[52] U.S. Cl. ........................................ 55/310; 55/523; 55/DIG. 30; 210/510.1; 422/180
[58] Field of Search ................ 55/309, 310, 312, 523, 55/DIG. 5, DIG. 30; 210/510, 510.1; 501/80, 112, 119; 165/8; 60/295, 299, 311; 422/180; 428/116–118; 29/163.5 F; 252/477 R

[56] References Cited

U.S. PATENT DOCUMENTS

| | | | |
|---|---|---|---|
| 2,907,405 | 10/1959 | Marshall | 55/309 |
| 3,499,269 | 3/1970 | Bois | 55/309 |
| 3,738,089 | 6/1973 | Brill | 55/310 |
| 4,251,239 | 2/1981 | Clyde et al. | 55/523 |
| 4,276,071 | 6/1981 | Outland | 55/523 |
| 4,293,357 | 10/1981 | Higuchi et al. | 55/523 |
| 4,329,162 | 5/1982 | Pitcher, Jr. | 55/DIG. 30 |
| 4,364,760 | 12/1982 | Higuchi et al. | 210/510 |
| 4,364,761 | 12/1982 | Berg et al. | 210/510 |

FOREIGN PATENT DOCUMENTS

| | | | |
|---|---|---|---|
| 539259 | 11/1931 | Fed. Rep. of Germany | 55/309 |
| 2930645 | 2/1981 | Fed. Rep. of Germany | 55/523 |
| 411377 | 6/1934 | United Kingdom | 60/299 |

Primary Examiner—David L. Lacey
Attorney, Agent, or Firm—Cushman, Darby & Cushman

[57] ABSTRACT

An exhaust gas filter is formed of ceramic honeycomb structure and provided with large number of passages defined by porous thin separator walls. The passages are composed of exhaust gas inlet passages and outlet passages which are alternately arranged. The honeycomb structure is further provided with exhaust gas blowing passages through which one part of exhaust gases entering into the inlet passages is discharged, without passing through minute pores of the porous thin separator walls, resulting in reducing the pressure loss of the exhaust gases.

4 Claims, 9 Drawing Figures

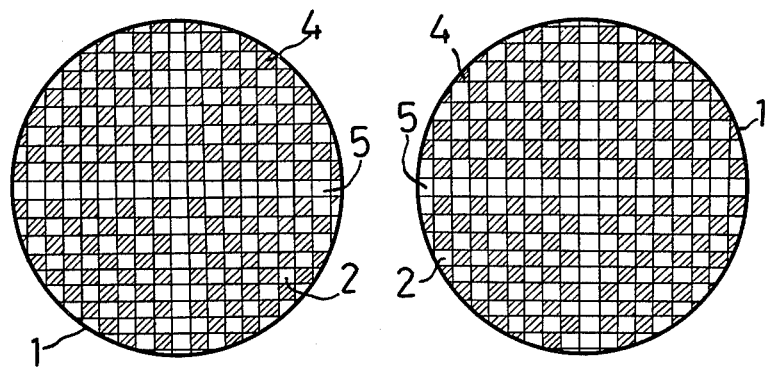
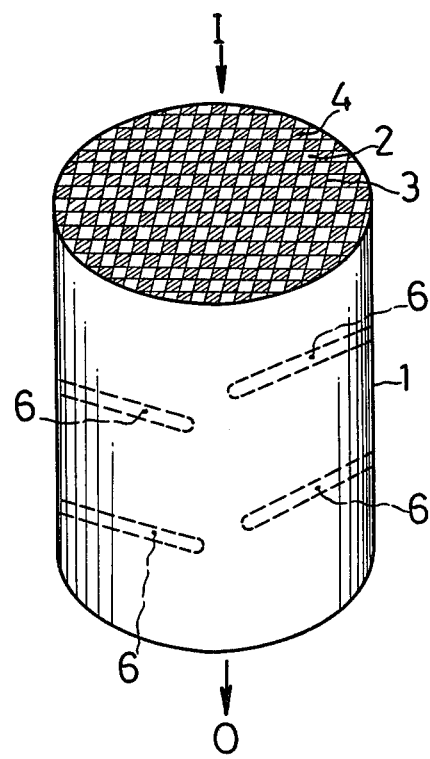

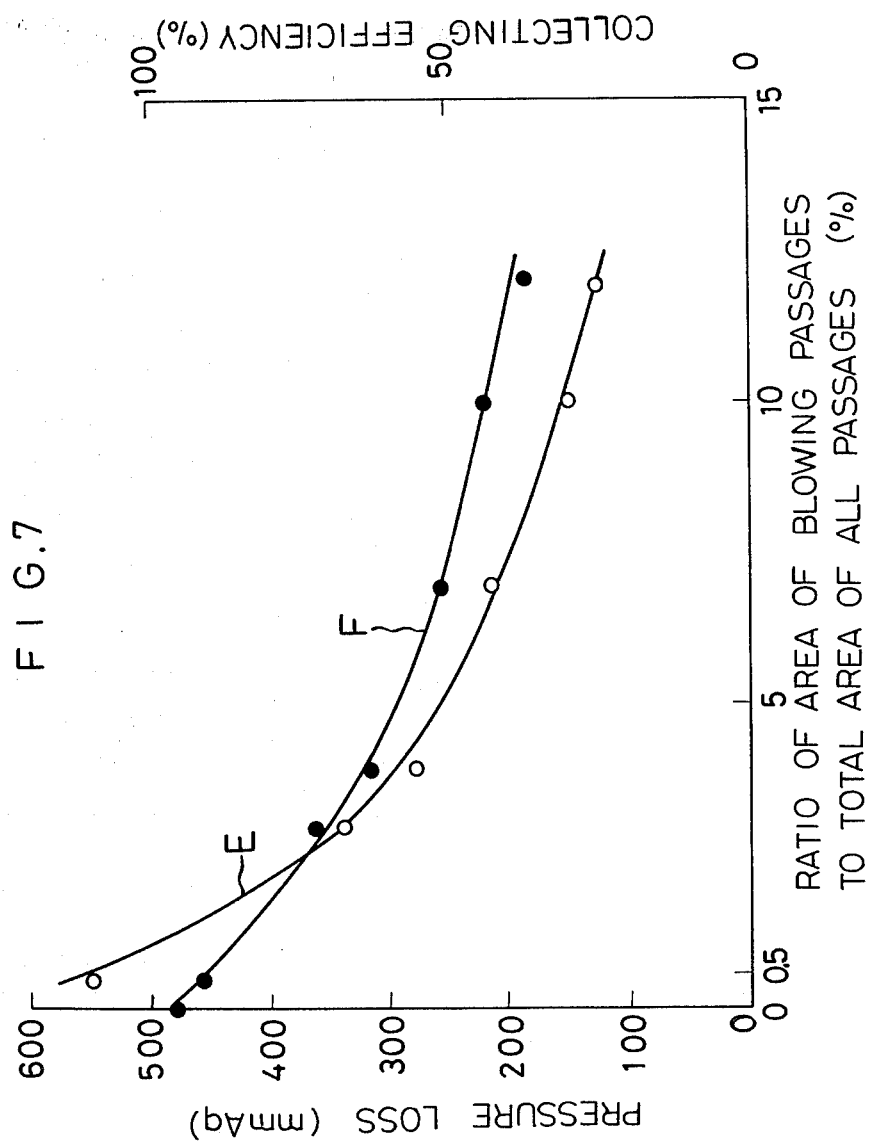

4,464,185

EXHAUST GAS FILTER

BACKGROUND OF THE INVENTION

The present invention relates to an exhaust gas filter for collecting carbon particles in exhaust gases discharged from an internal combustion engine, particularly a diesel engine of an automobile or the like.

Conventionally, such a filter as described above has been formed of a honeycomb structure provided with a large number of axially extending passages which are defined by separator walls, for example.

However, in this conventional filter, the major part of the carbon particles pass through the passages without interfering with the surfaces of the separator walls.

Therefore, the exhaust gas purifying efficiency is low.

In order to solve the above described problem, an exhaust filtration device is proposed in U.S. Pat. No. 4,276,071. This device is composed of a ceramic monolith provided with a plurality of inlet passages and a plurality of outlet passages, which are defined by a plurality of porous thin walls. The inlet passages are open at the inlet end of the monolith and closed at the outlet end thereof while the outlet passages are closed at the inlet end of the monolith and open at the outlet end thereof.

According to this device, the exhaust gases enter the inlet passages and flow into the adjacent outlet passages, passing through the porous walls. And the purified exhaust gases are discharged from the outlet passages. Therefore, the filtration area of this device for the exhaust gases is high so that the exhaust gas purifying efficiency can be improved.

However, in this device, pressure loss of the exhaust gases rapidly increases when the porous walls begin to be clogged by the carbon particles.

Accordingly, one object of the present invention is to provide an exhaust gas filter having a honeycomb structure for purifying exhaust gases with a high particulates collecting efficiency, without an increment in pressure loss of the exhaust gases.

Another object of the present invention is to provide an exhaust gas filter provided with porous thin separator walls defining inlet passages into which the exhaust gases enter and outlet passages from which the exhaust gases are discharged, and means for preventing the pressure loss of the exhaust gases from increasing.

DESCRIPTION OF THE DRAWINGS

Other objects and advantages of the invention will become apparent from the following description of embodiments thereof with reference to the accompanying drawings wherein:

FIG. 6(a) is a plan view of one end of the filter of a second embodiment;

FIG. 6(b) is a plan view of the other end of the filter of the second embodiment;

FIG. 7 is a graph showing a carbon particles collecting characteristics of the second embodiment; and FIG. 8 is a perspective view of a third embodiment according to the present invention.

SUMMARY OF THE INVENTION

The exhaust gas purifying filter according to the present invention is formed of a ceramic honeycomb structure and is provided with a large number of porous thin separator walls defining a large number of passages.

The passages are composed of inlet passages and outlet passages which are alternately arranged. The inlet passages are open at the inlet end of the filter and are closed at the outlet end thereof while the outlet passages are closed at the inlet end of the filter and are open at the outlet end thereof. In the porous separator walls, exhaust gas blowing pores are formed so as to be spaced from one another at substantially equal distances for flowing exhaust gases therethrough with remarkably small resistance. The diameter of the exhaust gas blowing pores is not greater than that of the inlet passages or the outlet passages and is larger than that of the minute pores formed in the separator walls.

One part of the exhaust gases entering into the inlet passages is discharged from the outlet passages, passing through the exhaust gas blowing pores.

Therefore, as compared with the conventional device shown in U.S. Pat. No. 4,276,071, the pressure loss of the exhaust gases passing through the filter can be reduced.

Furthermore, by partially opening the closed ends of the inlet passages and the outlet passages, or by forming exhaust gas blowing passages so as to penetrate the inlet passages and outlet passages from the outer surface of the filter, the pressure loss can also be reduced.

DETAILED DESCRIPTION OF THE INVENTION

Hereinafter, the present invention will be explained in accordance with the several embodiments with reference to the accompanying drawings.

Figure 1:
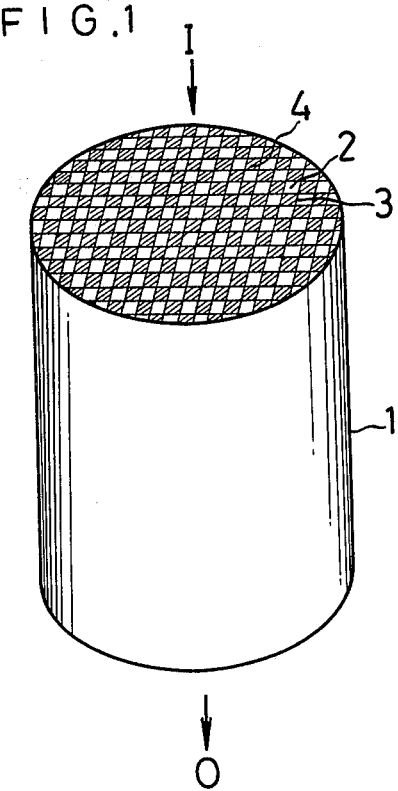
FIG. 1 is a perspective view of a first embodiment of an exhaust gas purifying filter according to the present invention.
Figure 2:
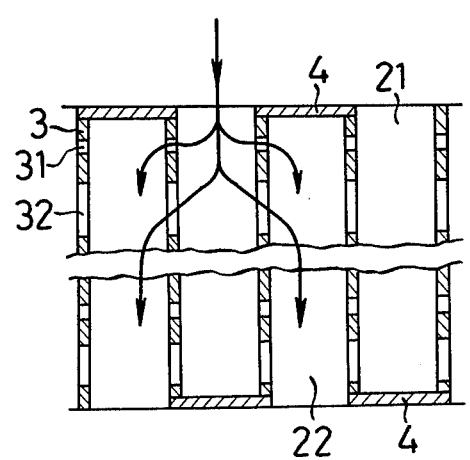
FIG. 2 is a partially cut away sectional view of FIG. 1.

FIGS. 1 and 2 illustrate the exhaust gas purifying filter 1 of a first embodiment of the present invention.

The filter 1 has an outer diameter of 100 mm, a length of 120 mm and a cell density of 100 cells/inch$^2$. The filter 1 is provided with a large number of axially extending passages 2 defined by a larger number of separator walls 3. In the separator walls 3, a large number of minute pores 31 of which the diameter is $1\mu \sim 90\mu$, and a large number of exhaust gas blowing pores 32 of which the diameter is not less than $100\mu$ are uniformly distributed, as shown in FIG. 2. The passages 2 communicate with the adjacent ones through the minute pores 31 and the exhaust gas blowing pores 32.

The passages 2 are composed of inlet passages 21 and outlet passages 22 which are alternately arranged in any transverse direction of the filter 1. The inlet passages 21 are open at the inlet end of the filter 1 and are closed at the outlet end thereof by cover members 4 formed of the same material as that of the filter 1.

The outlet passages 22 are closed at the inlet end of the filter 1 by cover members 4 formed of the same material as that of the filter 1, and are open at the outlet end thereof.

The filter 1 having the above described structure is mounted to the exhaust pipe of an automobile so that the exhaust gas containing carbon particulates enter into the inlet passages 21 from the direction of I and are discharged from the outlet passages 22 in the direction of O, after passing through the minute pores 31 and the exhaust gas blowing pores 32 which are formed in the separator walls 3.

Hereinafter, the method of producing the filter 1 of the first embodiment will be explained.

To 1500 g of cordierite fine powder of less than 100 mesh (149μ), 50 g of iron powder of 280 to 325 mesh (53 to 44μ), 5 g of iron powder of 100 to 145 mesh (149 to 105μ), 90 g of methyl cellulose and 400 cc of water are added and kneaded together. The obtained slurry is extruded by means of a well known extrusion die to obtain a honeycomb body. The obtained honeycomb body is dried at 80° C. for 10 hours.

Next, both ends of the honeycomb body are covered with ceramic green sheets formed of the same material as that of the honeycomb body and openings are formed in the ceramic green sheets to form the inlet passages and the outlet passages described above.

Then, the obtained honeycomb body is fired at 1300° to 1470° C. for 5 hours to form a filter 1.

The filter 1 produced by the above described method was mounted to the exhaust pipe of a 2200 cc diesel engine which was driven under conditions of 1000 r.p.m. and no load and the carbon particles collecting characteristics were measured. The average carbon particles collecting efficiency for 1 hour was 60%, and the pressure loss after 1 hour was 250 mm Aq.

Figure 3:
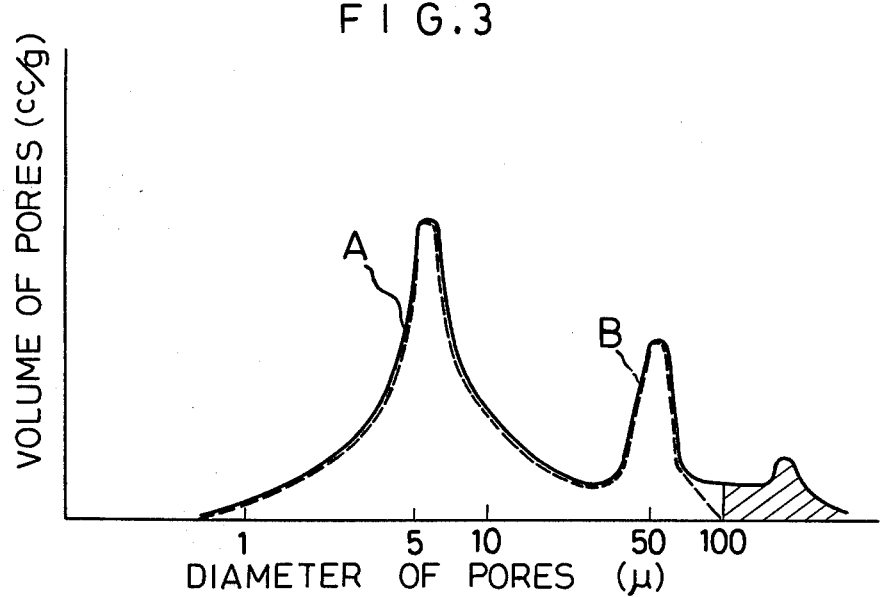
FIGS. 3 and 4 are graphs showing the relation between the diameter of the pores formed in the separator walls and the volume of the pores.

In the separator walls 3, the minute pores 31 and the exhaust gas blowing pores 32 are distributed as shown by the line A in FIG. 3. The volume of the blowing pores 32 of which the diameter is not less than 100μ is above 10 percent of the total volume of the pores 31 and 32.

The filter 1 of the first embodiment can be also formed of alumina, mullite, spodumen or other ceramic material. And as the additive to the ceramic material, the material which melts at a temperature lower than the melting point of the ceramic material, such as copper or feldspar, or that which forms an eutectic alloy or a solid solution with the ceramic material during the firing step, such as iron, nickel, or cobalt, is employed.

When the ceramic material is fired together with the above described additive, the additive firstly melts and diffuses into the ceramic material so that the firing shrinkage in the vicinity of the additive is increased.

As a result, in the separator walls, pores having a diameter much larger than that of the particle diameter of the additive, respectively, are formed.

In order to form the pores 31 and 32 in the separator walls 3, the particle diameter of the additive to be added to the ceramic slurry can be smaller than the thickness of the separator walls 3.

When the additive having a particle diameter is the same as or larger than the thickness of the separator walls 3, is added to the ceramic slurry, the extrusion slits of the extrusion die are apt to be clogged by the particles of the additive.

According to the present invention, by using the above described additive of which the particle diameter is four fifths or less of the thickness of the separator walls, such pores can be formed in the separator walls.

Figure 5:
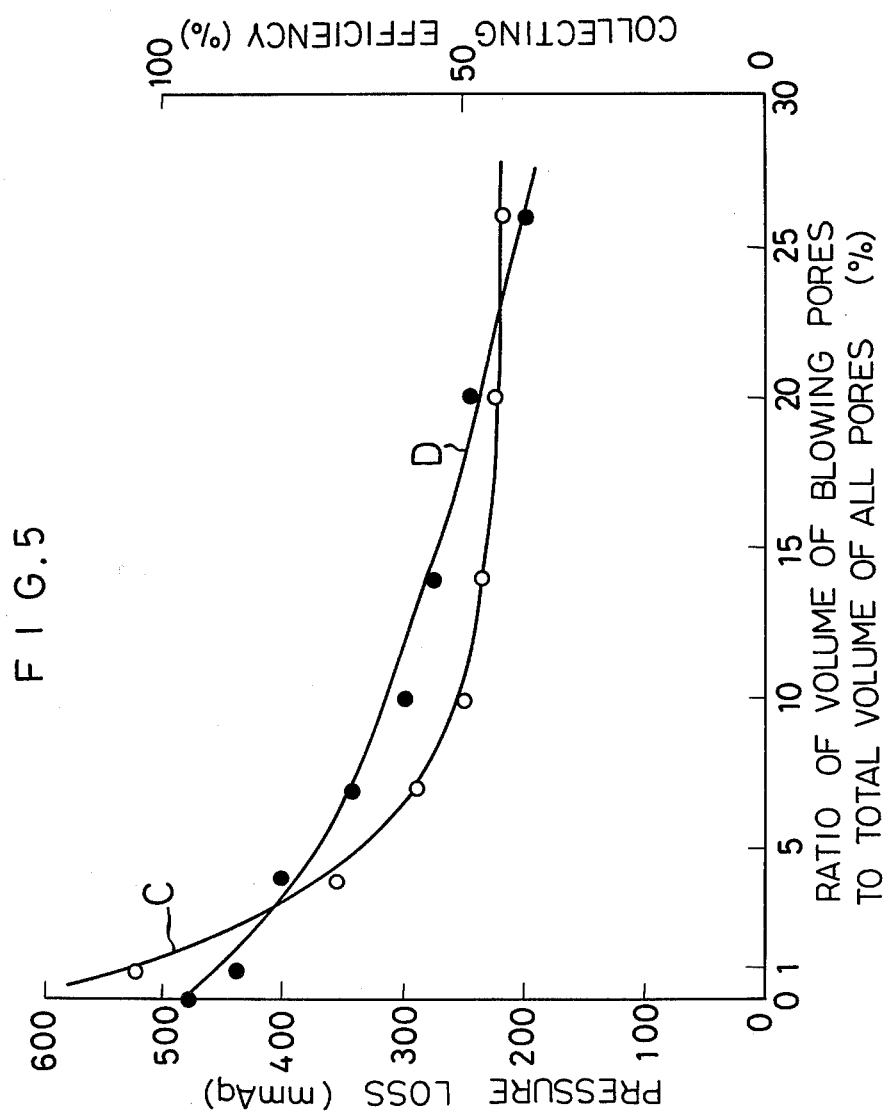
FIG. 5 is a graph showing the carbon particles collecting characteristics of the first embodiment.

Several samples of filters were produced by the above described method wherein the amount of iron powder and the particle diameter thereof were changed variously and the ratio of the volume of the blowing pores of which the diameter is not less than 100μ, to the total volume of all pores, the average carbon particles collecting efficiency for 1 hour, and the pressure loss after 1 hour of each sample were measured, and their relationships are shown in FIG. 5. In FIG. 5, line C shows the pressure loss and line D shows the carbon particles collecting efficiency.

When that ratio is less than 1%, the pressure loss exceeds 500 mm Aq. In this case, output of the engine is reduced and the fuel consumption is increased. And when that ratio is more than 20%, the collecting efficiency is decreased to less than 50%.

Therefore, the ratio of the volume of the blowing pores of which the diameter is not less than 100μ to the total volume of all pores is proper and in the range of 1 to 20%.

Figure 4:
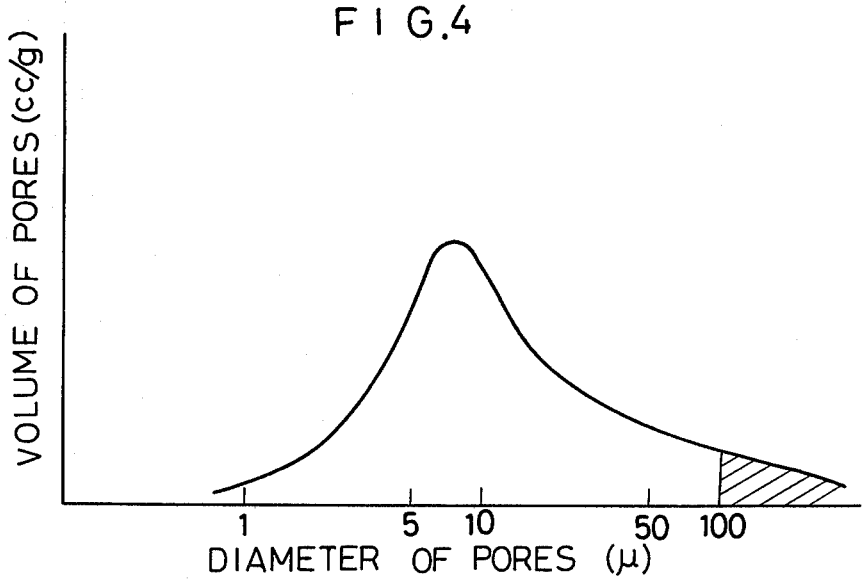

The distribution of the pores formed in the separator walls is not limited to that shown by line A in FIG. 3. For example, such a distribution as shown in FIG. 4 is equally as satisfactory.

The maximum opening area of each blowing pore 32 formed in the separator wall 3 is equal to the sectional area of each axially extending passage 21 or 22. When the opening area of each blowing pore exceeds the sectional area of the passage 21 or 22, almost all of the exhaust gases pass through the blowing pores without interfering with the separator walls and are discharged from the outlet passages so that the carbon particles are neither caught nor collected by the filter.

The sectional shape of the axially extending passages 21 or 22 is not limited to a square shape. Other shapes, for example, a rectangular, a triangular, a hexagonal, or a circular shape, will do.

FIGS. 6(a) and 6(b) illustrate a second embodiment of the filter member according to the present invention.

In the filter member of the second embodiment, exhaust gas blowing pores with a diameter more than 100μ as disclosed with respect to the first embodiment are not formed in the separator walls.

According to the second embodiment, one part of the axially extending passages 2 constitute exhaust gas blowing passages 5 which are open at both of the inlet and outlet ends of the filter 1. Other structures of the filter of the second embodiment are substantially the same as those of the first embodiment.

The opening area of the exhaust gas blowing passages 5 is about 4% of the total area of the passages 2 of filter 1. The distribution of the minute pores 31 formed in the separator walls 3 is shown by the line B in FIG. 3.

Next, the carbon particles collecting characteristics of the filter 1 of the second embodiment were measured by the same method as that of the first embodiment. As a result, the average collecting efficiency for 1 hour was 63% and the pressure loss after 1 hour was 280 mm Aq.

Next, several samples of the filter according to the second embodiment were produced by changing the opening area of the exhaust gas blowing passages. And the pressure loss and the collecting efficiency of each sample were measured and shown in FIG. 7. In FIG. 7, the line E shows the pressure loss and the line F shows the carbon particles collecting efficiency.

As is apparent from FIG. 7, when the ratio of the opening area of the blowing passages to the total opening area of the extruded honeycomb body is less than 0.5% or more than 10%, a desirable filter cannot be obtained by the same reasons as those described in the first embodiment.

The exhaust gas blowing passages can be randomly distributed or partially concentrated.

FIG. 8 illustrates a third embodiment according to the present invention.

In the filter 1 of the third embodiment, blowing pores as described in the first embodiment are not formed in the separator walls.

According to the third embodiment, exhaust gas blowing holes 6 having a diameter larger than the minute pores of the separator walls 3, for example, not less than 100μ, are formed as shown in FIG. 8. The exhaust gas blowing holes 6 are mechanically formed by means of a drill or the like. Other structures of the third embodiment is substantially equal to that of the first embodiment.

The pressure loss and the collecting efficiency were measured in relation to the opening area of the exhaust gas blowing holes 6 by the same method as that of the first embodiment. As a result, the proper opening area of the blowing holes 6 was 0.5 to 10% of the total opening area of the passages 2 for the same reasons as described in the first embodiment.

In the preceding embodiments, the exhaust gas blowing pores, passages or holes are formed so as to have a diameter of not less than 100μ. If the diameter of the blowing pores, passages or holes is relatively larger than that of the minute pores formed in the separator walls then the minimum diameter of the blowing pores or the like is not limited to 100μ.

As described above, according to the filter of the present invention, the carbon particles in the exhaust gases can be effectively caught and collected and the pressure loss occurring when the exhaust gases pass through the filter can be reduced.

What is claimed is:

1. An exhaust gas filter for collecting carbon particles in the exhaust gases discharged from internal combustion engines, comprising:
    a ceramic monolith having grid-shaped separator walls defining a large number of parallel exhaust gas passages, the cross sectional area of said passages being substantially the same;
    said separator walls having a large number of minute pores;
    said exhaust gas passages being composed of inlet passages which are open at one end of said filter and are closed at the other end thereof by cover means, and outlet passages which are closed by cover means at said one end of said filter and are open at said the other end thereof;
    said inlet passages being communicated with said outlet passages through said minute pores of said separator walls; and
    said separator walls further having a large number of exhaust gas blowing pores of a diameter not less than 100μ which diameter is larger than said minute pores and the total volume of said blowing pores is 1 to 20% of the total volume of all of said pores, whereby one portion of the exhaust gases entertaining said inlet passages blows through said blowing pores without passing through said minute pores formed in said separator walls.

2. An exhaust gas filter according to claim 1, wherein:
    said ceramic monolith is formed of cordierite, alumina, mullite or spodumen.

3. An exhaust gas filter according to claim 1, wherein:
    said inlet passages and said outlet passages are arranged such that said inlet passages alternate with said outlet passages adjacent each other.

4. An exhaust gas filter according to claim 1, wherein:
    the diameter of said blowing pores is not more than that of said exhaust gas passages.

* * * * *